Oct. 16, 1962   E. C. BENBOW ETAL   3,059,181
METER APPARATUS
Filed Jan. 18, 1960   2 Sheets-Sheet 1

INVENTORS
Eugene C. Benbow &
Eugene C. Knecht.
BY
ATTORNEY

Oct. 16, 1962 E. C. BENBOW ETAL 3,059,181
METER APPARATUS
Filed Jan. 18, 1960 2 Sheets-Sheet 2

United States Patent Office 3,059,181
Patented Oct. 16, 1962

3,059,181
METER APPARATUS
Eugene C. Benbow and Eugene C. Knecht, Raleigh, N.C., assignors to Westinghouse Electric Corporation, East Pittsburgh, Pa., a corporation of Pennsylvania
Filed Jan. 18, 1960, Ser. No. 2,892
6 Claims. (Cl. 324—103)

This invention relates to meter apparatus and more particularly to a device for resetting the pointer of maximum demand registers, especially in watthour meters.

One form of reset device usually includes a shaft-mounted finger disposed with the meter inside a glass cover and movable from outside the cover by an operating member. The finger is used for moving a maximum demand pointer downscale toward a zero reading. The ideal reset device is foolproof; its operating member may be locked or sealed; it is easily installed, gentle in operation, inexpensive to make; and it is small enough to fit with the meter in compact outdoor enclosures.

Older reset mechanisms vary in construction and all involve one or more disadvantages, usually from the standpoint of cost of production, size, ease of installation, and sometimes all of them. For example, some prior reset mechanisms do not lend themselves to compact construction, and they are thus incapable of fitting with the meter in some outdoor meter enclosures. Other constructions may require expensive ratchets, springs or cams to ensure gentle and foolproof operation. Still other constructions require a slotted stud or post to be mounted in a specially formed hole in the glass cover if the operating member is to be sealed or locked; and arrangements of this kind are obviously objectionable where ease of installation is required.

A reset mechanism or device constructed according to the present invention is believed to possess the aforesaid ideal characteristics. It comprises a bushing mountable on a meter cover, and a shaft rotatably carried in the bushing. One portion of the shaft is adapted to extend inside the cover, and to this portion is secured a flexible finger extending transversely to the shaft axis. The finger is movable by the shaft into and out of gentle engagement with the maximum demand pointer in order to move the latter downscale toward a zero reading. Outside the cover is a crank or operating arm which is in driving relation to the shaft for manually moving the flexible finger. The crank arm is pivotally connected to the outer end portion of the shaft for swinging movement between axially and transversely extending postions relative to the shaft. Non-rotatably mounted on the bushing is a bracket. This bracket includes a U-loop or bight portion provided with a slot extending radially with respect to the shaft axis for receiving the crank arm in one particular radially extending position thereof. The latter position of the crank arm is made to correspond with a position of the finger in which it is at or beyond the highest maximum demand position to the pointer; and in this position the crank arm is locked between meter readings.

It is an object of the present invention to provide a dependable reset device, for the purpose stated, which lends itself to compact construction.

It is another object of the present invention to provide an improved weatherproof reset device through which moisture cannot enter the meter.

Still another object of the invention is to provide an improved reset device which may be conveniently locked or sealed in any one of the several ways now practiced.

The foregoing and other objects are effected by the invention as will be apparent from the following description and claims taken in connection with the accompanying drawing, forming a part of the present application, in which:

Figure 1:
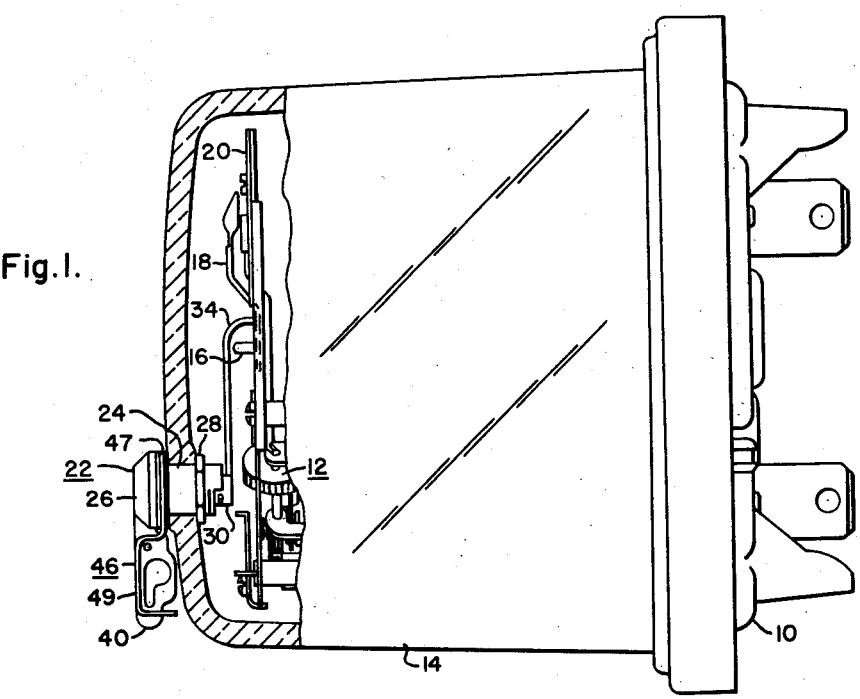
FIG. 1 is a side elevational view of a meter embodying the invention, with portions of its glass cover broken away.
Figure 3:
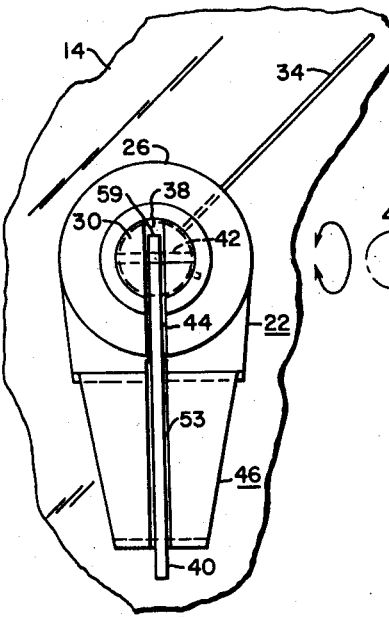
FIG. 3 is a front elevational view of the reset mechanism shown in FIG. 2.

Referring in detail to the drawing, the invention has been applied to a watthour meter having a base 10 on which is mounted a meter mechanism 12 enclosed by a glass cover 14. The meter mechanism 12 has suitable means, including a pusher 16 and a pointer 18, for registering maximum demand on an outwardly facing scale 20. In response to momentary demand, the pusher 16 may move the pointer 18 angularly relative to the scale 20, but only in an upscale direction. As a result of friction, the pointer 18 remains where pushed to register the consumer's maximum power demand at any one time during a billing period; all of which is well known in the art.

A reset mechanism 22 is provided so that pointer 18 can be moved downscale to zero position, or the position of the momentary demand, when the meter is read at the end of the billing period. The reset mechanism 22 includes a tubular bushing 24 provided with an axial bore 25 and having a non-circular cross section intermediate its ends. The bushing 24 extends through a correspondingly shaped mounting hole in the glass cover 14, the non-circular cross-sectional shape preventing rotation of the bushing 24 in the mounting hole. To hold the bushing 24 against longitudinal movement, it has an enlarged head or flange portion 26 on its outer end and a nut 28 threaded on its inner end.

A shaft 30 of generally circular cross section is rotatably carried in the bushing 24, the outer ends of these parts being coextensive, and the inner end of the shaft extending inwardly beyond the bushing. The device may be weatherproofed by including a resilient ring 32 which may be constructed of rubber or other elastomer and which is carried in a groove on the shaft 30 to provide an annular seal between the shaft and the bushing.

The reset mechanism 22 also includes a flexible finger 34 made from a length of resilient wire bent to the shape shown in the drawing. The finger 34 extends radially outwardly from the inner end of the shaft 30 to which it is suitably secured, as by soldering it in a slot of cruciform shape. It is the function of the finger 34 to engage the pointer 18 gently and move it downscale to a zero position, or the position of momentary demand.

The shaft 30 is held against axial movement relative the bushing 24 by means of a radially projecting stop pin or member 36 snugly fitting a hole in the inner end of the shaft, and also by an enlarged outer end. The enlarged outer end of the shaft 30 is provided with a diametrical slot 38 which opens outwardly and receives one end of a crank-like operating arm 40. The latter is pivotally mounted on the slotted end of the shaft 30 by a transversely disposed pivot pin 42 so that the arm 40 can be manually moved thereabout between axially and radially extending positions relative the shaft. The arm 40 is used by the meter reader to rotate the shaft 30 which, in turn, moves the finger 34 through an arc to reset the pointer 18. The arm is then counter-rotated, if necessary, and the finger 34 returned to its original, out-of-the way position. In some applications the finger 34 may be rotated to reset the pointer 18, and continued rotation carries the resilient finger 34 over the pointer to the locking position.

The head 26 of the bushing 24 is provided with an outwardly opening radial slot 44 for receiving the operating arm 40 in one radial position. This slot 44 is substantially as deep as the slot 38 in the outer end of the shaft 30. The orientation of the slot 44 with respect to the finger 34 is such that it receives the arm 40 when the finger is non-engageable with the pointer 18 below the latter's highest maximum demand position. With this arrangement the finger 34 does not interfere with the movement of the pointer 18 between meter readings as long as the arm 40 is in the slot 44.

Figure 4:
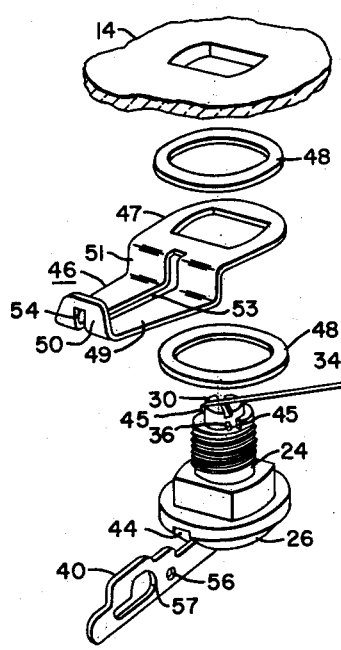
FIG. 4 is an exploded perspective view of portions of the reset mechanism of FIGS. 2 and 3, shown together with a fragment of the glass cover in which the mounting hole is formed.

The arm 40 may be moved out of the bushing slot 44 towards an axially extending position, or at least to an intermediate position, wherein it may be turned to rotate the shaft 30. Turning the shaft 30 rotates the finger 34 through an arcuate path. If desired, the shaft 30 may be made rotatable for less than one full revolution by providing spaced stops 45 on the inner end of the bushing 24 and in the path of movement of the stop pin 36 to limit finger movement. (See FIG. 4). When it is desired to return the arm 40 to a radial position in the bushing slot 44, the arm 40 may be moved about pin 42 to an intermediate position in which it rides on the outer end of the bore surface while being turned into alignment with the slot 44 so that it is guided therein, assuming a radial position. In such an intermediate position the arm 40 of the preferred embodiment would make an angle of approximately 35° with the shaft axis.

A bracket 46 is provided for securing the arm 40 between meter readings. Preferably, this bracket 46 is unitarily made from formable sheet metal and includes a base portion 47 in which is formed a non-circular opening for snugly and non-rotatably receiving the non-circular body of the bushing 24. A resilient washer 48 may be disposed between the bracket 46 and the outside of the glass cover 14 and another resilient washer 48 between the bracket 47 and the head 26 for weatherproofing when the device is assembled. In this way the bracket 46 is stationarily secured to the cover 14 solely by the bushing 24.

The bracket 46 includes a hasp-like bight portion 49 which is bent to establish a U-loop, as shown in the drawing and comprises a pair of legs 50 and 51 and a connecting member 52. The legs 50 and 51 are axially coextensive with the head 26 of the bushing 24 and each leg has one end close to the cover 14 and another end spaced appreciably from the cover. A member 52 connects together the ends of the legs 50 and 51 which are farthest from the cover 14. The end closest to the cover of the radially innermost leg 51 is rigidly joined to the base 47 of the bracket 46 so that the bight portion 49 is non-rotatably connected to the bushing 24.

Formed in the bracket 46 is a radial slot 53 which extends through the bight portion 49, in alignment with bushing slot 44, for receiving the operating arm 40 when the finger 34 is in an inactive position. In the radially outermost leg 50, slot 53 terminates short of the end closest to the cover 14, thus providing an abutment 54 for limiting the pivotal movement of the arm 40 towards the cover 14. It will be noted that the free end of arm 40 is notched in one corner to receive the abutment 54 when the arm 40 is in locked position.

In the radial position of arm 40 its overall axial dimension is about equal to that of the legs 50 and 51. Also in this position, arm 40 has an apertured portion encompassed by the bight portion 49 and a surface portion of the glass cover 14. In this apertured portion, arm 40 is provided with a small circular hole 56 adjacent the bend at the junction of connecting member 52 and the radially innermost leg 51, this arrangement making it easier to pass a seal wire through hole 56 because the bracket serves as a threading guide. Additionally, a keyhole opening 57 in the apertured portion of arm 40 is provided adjacent the radially outermost leg 50, this shape opening accommodating either a band seal or the loop of a padlock. The arm 40 will remain locked against movement to an axial position so long as a locking wire or member is received in hole 56 and/or opening 57. Thus, it can be seen that any one of the several kinds of seals and/or locks in current use may be used to secure the operating arm 40 to the bracket 46.

Preferably the pivoted end of the arm 40 has one squared-off corner 59 which acts as a stop. The latter is so arranged with respect to the shaft slot 38 that the arm 40 is incapable of 180° swinging movement about pin 42. This provision limits swinging movement of the arm 40 and prevents its being locked to the bracket 46 in an inverted radial position wherein it could interfere with pointer movement.

When properly installed the reset device 22 may be used by first removing seals or locks. Then the operating arm 40 is swung outwardly at least until it clears the slots 44 and 53, and then it is turned until the resilient finger 34 moves the pointer 18 downscale to a zero position, or the position of momentary demand. In the illustrated form of the invention the arm 40 is then moved in the opposite direction, rotating the shaft 30, until the arm can be received in the bracket slot 53. In this position of the shaft all slots are aligned, and the finger 34 cannot be engaged by the pointer 18 below its highest maximum demand position on the scale 20. The arm 40 is next swung from an axial position back to a radial position, after which it is locked or sealed to the bracket 46.

From the foregoing it will be apparent that a reset device has been provided which not only is foolproof and gentle in operation, but also is more compact, easier to install, and less expensive to make than prior art reset devices.

Some registers are reset by means of a reciprocating plunger. An example of such a register is found in the Lewis et al. Patent 2,259,314, patented October 14, 1941. This register has a resetting rod 154 which is reproduced in part in FIG. 6.

Figure 2:
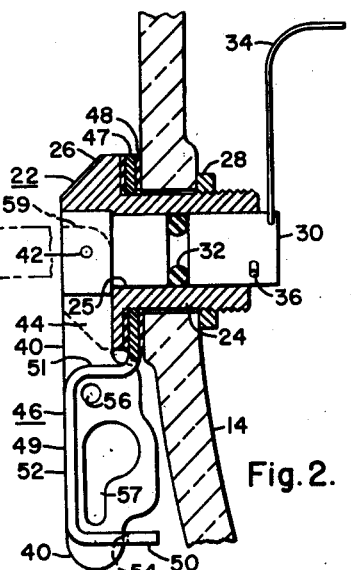
FIG. 2 is an enlarged view, partly in side elevation and partly in section, of the reset mechanism shown in FIG. 1.
Figure 6:
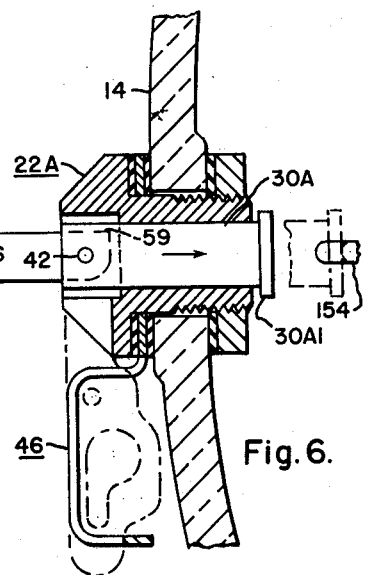
FIG. 6 is a sectional view showing a modified reset mechanism.
Figure 5:
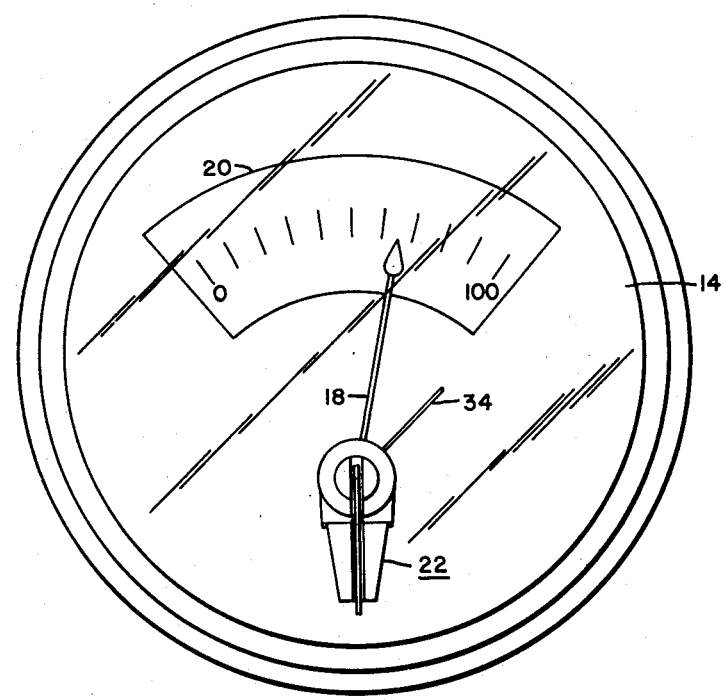
FIG. 5 is a front elevational view of the apparatus of FIG. 1.

In FIG. 6 a reset mechanism 22A is illustrated. This mechanism is similar to the reset mechanism 22 of FIG. 1, except for the replacement of the shaft 30 of FIG. 1 by a shaft 30A having a head 30A1 positioned adjacent the resetting rod 154. Although the shaft 30A may have a ring similar to the ring 32 of FIG. 2, it will be assumed that such a ring is not employed in FIG. 6. Otherwise the shaft 30A is similar to the shaft 30 of FIG. 1.

In order to reset the register of FIG. 6, the arm 40 is pivoted from its sealing position to the position shown in FIG. 6 wherein the arm 40 and the shaft 30A are aligned. The arm 40 is then actuated to the right as viewed in FIG. 6 to actuate the rod 154 for the purpose of resetting the associated register. Following completion of the resetting operation the arm 40 is moved to its sealing position in a manner which will be apparent from the discussion of FIGS. 1 to 5.

What is claimed is:

1. A device for resetting the pointer of a maximum demand register to its initial position, wherein said register is enclosed at least partly by a cover provided with a non-circular opening, said device comprising a bushing of non-circular cross-section non-rotatably mountable in said opening, a shaft of generally circular cross section movably carried in said bushing, said shaft having an inner end portion adapted to be inside said cover and an outer end portion adapted to be outside said cover, resetting means coacting with said inner end portion so as to be movable by said shaft into resetting condition, said outer end portion of said shaft being substantially coextensive with the outer end of said bushing and provided with an outwardly opening and diametrically extending slot, a crank arm for rotating said shaft having one end received in the slotted outer end portion of said shaft and pivotally connected thereto for movement between axially and radially extending positions with respect to said shaft, and a bracket non-rotatably mounted on said bushing, said bracket having a portion spaced from the bushing and provided with a radially extending slot, said bushing having an outwardly opening slot extending radially between the slotted end of said shaft and the slot in said bracket, said crank arm being receivable in the slots in said bracket and said bushing in one radial position thereof.

2. A device for resetting the pointer of a maximum demand register to its initial position, and a cover at least partly enclosing said register, said cover being provided with a non-circular opening, said device comprising a tubular bushing, said bushing having an exterior surface portion of non-circular cross section snugly receivable in said opening for non-rotatably mounting said bushing on said cover and a head portion outside said cover, a shaft movably carried in said bushing, said shaft having an inner end portion adapted to be inside said cover and an outer end portion adapted to be outside said cover, resetting means coacting with said inner end portion of said shaft so as to be movable by said shaft into resetting condition, said outer end portion of said shaft being provided with a slot which opens outwardly and extends radially with respect to the shaft axis, a crank arm for turning said shaft received in said shaft slot and pivotally connected to said shaft for movement between axially and radially extending positions with respect to said shaft axis, and a bracket having a portion spaced from the bushing to which said crank arm may be secured in at least one radially extending position, said bracket including a base portion which is provided with a non-circular opening snugly and non-rotatably receiving the portion of said bushing which is of non-circular cross section, whereby said bracket is non-rotatably connected to said cover solely through said bushing.

3. A maximum demand register having a pointer movable between zero and maximum demand positions, a device for resetting said pointer to its zero position, and a cover at least partly enclosing said register, said cover being provided with a non-circular opening, said device comprising a tubular bushing having a non-circular portion non-rotatably positioned in the opening, said bushing including a head portion ouside said cover, a shaft movably carried in said bushing, said shaft having an inner end portion inside said cover and an outer end portion outside said cover, resetting means coacting with said inner end portion of said shaft so as to be movable by said shaft into resetting condition, said outer end portion of said shaft and the head portion of said bushing each being provided with a slot which extends transversely to the shaft axis, a crank arm for turning said shaft received in said shaft slot and pivotally connected to said shaft for movement between axially and radially extending positions with respect to said shaft axis, and a bracket having a portion spaced from the bushing to which said crank arm may be secured, said bracket being made from formable sheet metal and including a bight portion which is non-rotatably connected to said bushing and disposed radially outwardly from the head portion of said bushing; said bight portion including a pair of radially spaced legs which are arranged axially coextensive with the head portion of said bushing and a member connecting the respective ends of said legs most distant from said cover, said bight portion being provided with an axially opening slot aligned with the bushing slot for receiving said crank arm when the latter is in one radially extending position thereof; said finger being non-engageable with said pointer below the maximum demand position of said pointer when said crank arm is received in the slot in said bight portion.

4. A maximum demand register having a pointer movable between zero and maximum demand positions, a device for resetting said pointer to its zero position, and a cover at least partly enclosing said register, said cover being provided with an opening, said device comprising a bushing mounted on said cover and including a head portion outside said cover, a shaft movably carried in said bushing and extending through said cover opening, said shaft having an inner end portion inside said cover and an outer end portion outside said cover, resetting means coacting with said inner end portion of said shaft for movement by said shaft into resetting condition, a crank arm pivotally connected to the outer end portion of said shaft for movement between axially and radially extending positions with respect to said shaft, and a bracket of formable sheet metal having a portion spaced from the bushing to which said crank arm may be secured in one radially extending position thereof, said bracket being connected to said bushing and including a U-loop portion which is open adjacent the surface of said cover and includes a pair of radially spaced, axially extending legs, said bracket being provided with a slot extending radially through said loop portion and terminating short of the ends of said legs closest to said cover for receiving said crank arm when the latter is in one radially extending position, said crank arm having an apertured portion which in said one radially extending position of said crank arm is encompassed by said loop portion and said cover, the apertured portion of said crank arm being provided with a first opening which is adjacent the radially innermost of said legs and adapted to receive a wire fastening member, said apertured portion being provided adjacent the radially outermost of said legs with a keyhole-shaped second opening adapted to receive either band or bar fastening members.

5. A maximum demand register having a pointer movable between zero and maximum demand positions, a cover at least partly enclosing said register, said cover being provided with a non-circular opening, and an improved device for resetting said pointer to its zero position, said device comprising a tubular bushing having an exterior surface portion of non-circular cross section snugly receivable in said opening for mounting said bushing on said cover, a shaft rotatably carried in said bushing, said shaft having an inner end portion inside said cover and an outer end portion outside said cover, a finger extending radially with respect to the shaft axis and secured to said inner end portion of said shaft so as to be movable by said shaft into and out of engagement with said pointer to reset said pointer, said outer end portion of said shaft being provided with an outwardly opening and diametrically extending slot, crank arm for turning said shaft received in the slotted outer end portion thereof and pivotally connected thereto for movement between axially and radially extending positions with respect to said shaft axis, and a bracket to which said crank arm may be secured in one radially extending position thereof, said bracket being unitarily made from formable sheet metal and comprising a base portion and a radially projecting bight portion, said base portion having a non-circular opening snugly and non-rotatably receiving said bushing; said bight portion comprising radially spaced legs each extending in an axial direction away from said cover, and a member axially spaced from said cover connecting the ends of said legs farthest from said cover, the end closest to said cover of the radially innermost of said legs being connected to said base portion, the innermost end of said other leg terminating adjacent the surface of said cover, the axial extent of said legs being substantially the same as the axial extent of said crank arm when the latter is in said one radial position, said bracket being provided with a slot extending radially through said bight portion above the end closest to said cover of the radially outermost leg for receiving said crank arm when the latter is in said one radially extending position; said crank arm being provided with at least one aperture which, in said one radial position of said crank arm, is encompassed by said bight portion and a portion of said cover, said aperture being adapted to receive a locking element whereby said crank arm may be secured to said bracket; said finger being non-engageable with said pointer below the highest maximum demand position of said pointer when said crank arm is in said one radially extending position.

6. In a demand register resetting device, an anchor member, a resetting member, and means mounting the resetting member for movement from a locking position to a position clear relative to the anchor member for permitting movement of the resetting member relative to the anchor member for a resetting operation, one of said members having a circular opening and an elongated slot projecting from the circular opening in a direction transverse to the direction of movement from the locking position, said opening having a diameter substantially larger than the width of the slot, whereby a band seal may be inserted in the slot and a portion of the circular opening, a second one of said members having an aperture through which said first one of the members is movable when the seal is removed from the locking position wherein the slot and circular opening are on a first side of the second one of said members to the clear position wherein the slot and circular opening are on a second side of the second one of said members, the wall defining the circular opening being substantially tangent to a side wall of the slot which is adjacent to the second one of said members when the first one of said members is in the first position.

References Cited in the file of this patent

UNITED STATES PATENTS

| | | |
|---|---|---|
| 509,077 | Getze | Nov. 21, 1893 |
| 1,197,585 | Archibald | Sept. 12, 1916 |
| 1,495,444 | Sachs | May 27, 1924 |
| 2,123,943 | Hamill | July 19, 1938 |
| 2,123,944 | Hamill | July 19, 1938 |
| 2,132,256 | Cameron | Oct. 4, 1938 |
| 2,602,349 | Manning | July 8, 1952 |
| 2,851,664 | Tavis | Sept. 9, 1958 |